United States Patent
Davey et al.

[11] Patent Number: 6,138,452
[45] Date of Patent: Oct. 31, 2000

[54] CATALYTIC MONITORING METHOD

[75] Inventors: Christopher Kirk Davey, Novi; Michael Igor Kluzner, Oak Park; Robert Roy Jentz, Westland; Robert Joseph Jerger, Dexter, all of Mich.

[73] Assignee: Ford Global Technologies, Inc., Dearborn, Mich.

[21] Appl. No.: 09/263,457

[22] Filed: Mar. 5, 1999

[51] Int. Cl.[7] .................................... F01N 3/00
[52] U.S. Cl. ............................... 60/274; 60/285
[58] Field of Search ................... 60/274, 276, 277, 60/285, 286, 303

[56] References Cited

U.S. PATENT DOCUMENTS

| | | | |
|---|---|---|---|
| 5,083,427 | 1/1992 | Anderson | 60/274 |
| 5,115,639 | 5/1992 | Gopp | 60/274 |
| 5,158,058 | 10/1992 | Yoshida et al. | 60/285 |
| 5,289,678 | 3/1994 | Grutter | 60/277 |
| 5,353,592 | 10/1994 | Zimlich et al. | 60/274 |
| 5,357,751 | 10/1994 | Orzel . | |
| 5,363,646 | 11/1994 | Orzel et al. | 60/274 |
| 5,381,656 | 1/1995 | Orzel et al. | 60/274 |
| 5,385,016 | 1/1995 | Zimlich et al. | 60/274 |
| 5,386,693 | 2/1995 | Orzel | 60/274 |
| 5,404,718 | 4/1995 | Orzel et al. | 60/274 |
| 5,452,576 | 9/1995 | Hamburg et al. | 60/274 |
| 5,497,618 | 3/1996 | Brailsford et al. | 60/274 |
| 5,522,219 | 6/1996 | Orzel et al. | 60/274 |
| 5,974,790 | 11/1999 | Adamczyk et al. | 60/274 |

Primary Examiner—Teresa Walberg
Assistant Examiner—Fadi H. Dahbour
Attorney, Agent, or Firm—John D. Russell

[57] ABSTRACT

An adaptive catalytic monitoring method for an engine having two engine banks each coupled to one of two catalytic converters uses first and second exhaust gas oxygen sensors respectively upstream and downstream of one catalytic converter. Third and fourth exhaust gas oxygen sensors are respectively coupled upstream and downstream of the other catalytic converter. Switch ratios are determined for each of the engine banks based the switching ratios of each upstream and downstream pair of exhaust gas oxygen sensors, with the switch ratio being adjusted by an adjustment gain that is a function of airflow and a catalytic converter characteristic. A combination of the adjusted switch ratios is used to determine overall catalytic converter system performance.

21 Claims, 9 Drawing Sheets

CATALYTIC MONITORING METHOD

FIELD OF THE INVENTION

The invention relates catalytic converter monitoring systems of internal combustion engines responsive to exhaust gas oxygen sensors before and after the catalytic converter.

BACKGROUND OF THE INVENTION

To meet current emission regulations, automotive vehicles must have on-board diagnostic systems to detect the degradation of any component of the emission system, including a catalytic converter.

Catalytic converter monitoring systems are known in which an upstream and a downstream exhaust gas oxygen sensor are compared to give an indication of catalytic degradation. If sufficient degradation occurs, these systems will diagnose the deteriorated performance and indicate a degradation. As a result, a new catalytic converter may be required. When the measured performance of a catalytic converter falls below a predetermined threshold, degradation is indicated. An example of such an approach is disclosed in U.S. Pat. No. 5,357,751.

A better correlation between the measured degradation using the exhaust sensor and actual degradation is obtained when the measured degradation is adjusted based on the airflow through the catalytic converter. This adjustment can be found by numerical optimization and regression techniques for an initial catalytic converter having initial characteristics for catalytic converter monitoring.

The inventors herein have recognized a disadvantage with the above approach. Due to packaging constraints, changing emission regulations, or in-use service, catalytic converters having these initial characteristics are sometimes replaced with catalytic converters having different characteristics. Then, the adjustments that were designed for the initial catalytic converter no longer produce acceptable results in terms of catalytic converter monitoring.

For example, when monitoring a catalytic converter smaller than an initially sized catalytic converter, the performance index, or switch ratio approaches the maximum, or unity, before the emissions have reached the regulated level. Thus, the indication of degradation will falsely indicate that the catalytic converter must be replaced. Alternatively, when monitoring a catalytic converter larger than an initially sized catalytic converter, the performance index, or switch ratio, that represents emissions have reached the regulated level is relatively low and difficult to distinguish from properly functioning catalytic converters. This contrasts with the initial catalytic converter design in which the performance index, or switch ratio just reaches its maximum, or unity, when the catalytic converter just reaches a degradation level to produce emissions at the regulated level.

SUMMARY OF THE INVENTION

An object of the invention claimed herein is to provide an adaptive catalytic converter monitoring method capable of accounting for variations in catalytic converter characteristics.

The above object is achieved, and disadvantages of prior approaches overcome, by a monitoring method for an internal combustion engine with an emission control device. The method comprises the steps of determining an airflow range in which the engine is currently operating, calculating an emission control device performance index from exhaust gas sensors positioned upstream and downstream of the emission control device, determining a gain based on said airflow range, adjusting said gain based on an emission control device characteristic relative to an initial emission control device characteristic and based on said airflow range, modifying said emission control device performance index based on said adjusted gain, and indicating degradation based on said modified emission control device performance index.

By adjusting the gain in this way, the effects of catalytic converter characteristic variations are minimized in terms of catalytic converter monitoring ability. Thus, catalytic converters may be replaced without giving false monitoring indication.

When the airflow range gains are adjusted according to the present invention, they offset these deficiencies due to catalytic converter characteristic variation and allow for a more robust system.

An advantage of the present invention is the ability to more accurately determine the catalytic converter system performance.

Another advantage of the present invention is the reduction in false degradation indications.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1:
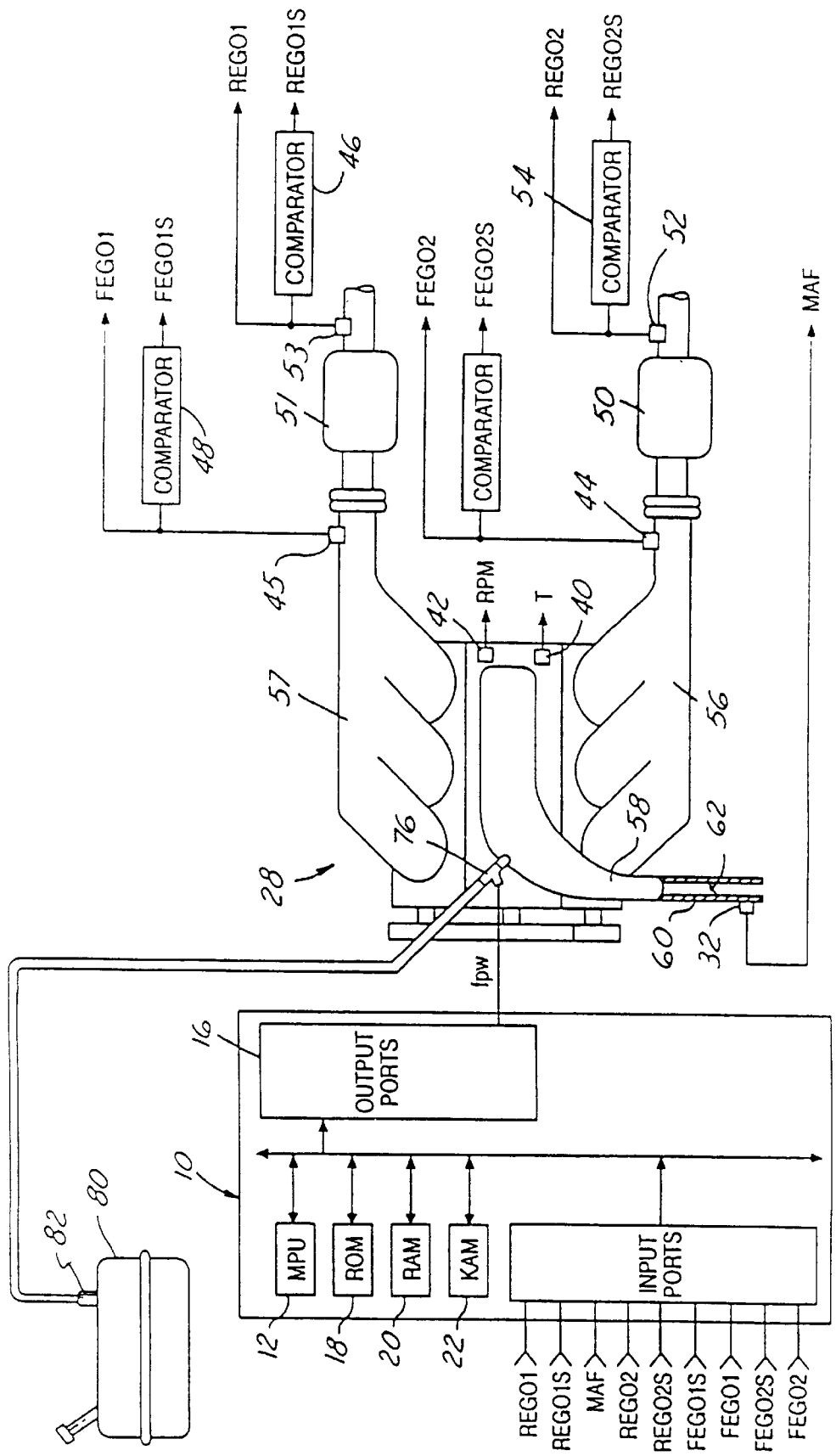
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18, for storing the control program; random access memory 20 for temporary data storage which may also be used for counters or timers; keep-alive memory 22, for storing learned values; and a conventional data bus.

Controller 10 is shown receiving various signals from sensors coupled to engine 28 including; measurement of inducted mass airflow (MAF) from mass airflow sensor 32; engine coolant temperature (T) from temperature sensor 40; and indication of engine speed (rpm) from tachometer 42. In this example, engine 28 is a V-type engine having first and second banks (not shown) coupled to respective first and second exhaust manifolds (57,56).

Output signal FEGO1 from conventional exhaust gas oxygen sensor 45, positioned upstream of first catalytic converter 51, is compared to a reference value associated with stoichiometry in comparator 48 for providing output signal FEGO1S. First catalytic converter 51 has monitored volume V1, not shown, which is the catalytic converter volume located between exhaust gas oxygen sensors 45 and 53. Signal FEGO1S is a two-state signal which is a predetermined high voltage when exhaust gases are rich of stoichiometry and a predetermined low voltage when exhaust gases are lean of stoichiometry. Both signal FEGO1 and signal FEGO1S are coupled to controller 10.

Output signal FEGO2 from conventional exhaust gas oxygen sensor 44, positioned upstream of second catalytic converter 50, is compared to a reference value associated with stoichiometry in comparator 46 for providing output signal FEGO2S. Second catalytic converter 50 has monitored volume V2, not shown, which is the catalytic converter volume located between exhaust gas oxygen sensors 44 and 52. Signal FEGO2S is a two-state signal which is a predetermined high voltage when exhaust gases are rich of stoichiometry and a predetermined low voltage when exhaust gases are lean of stoichiometry. Both signal FEGO2 and signal FEGO2S are coupled to controller 10.

Another conventional exhaust gas oxygen sensor (53) is shown coupled to exhaust manifold 57 downstream of catalytic converter 51 and provides signal REGO1 to controller 10 which is related to oxygen content in the exhaust gases. Output signal REGO1 is also compared to a reference value associated with stoichiometry in comparator 55 for providing two-state output signal REGO1S to controller 10. Signal REGO1S is preselected high voltage when exhaust gases downstream of catalytic converter 51 are rich of stoichiometry and a low preselected voltage when such exhaust gases are lean of stoichiometry.

Yet another conventional exhaust gas oxygen sensor (52) is shown coupled to exhaust manifold 56 downstream of catalytic converter 50 and provides signal REGO2 to controller 10 which is related to oxygen content in the exhaust gases. Output signal REGO2 is also compared to a reference value associated with stoichiometry in comparator 54 for providing two-state output signal REGO2S to controller 10. Signal REGO2S is preselected high voltage when exhaust gases downstream of catalytic converter 50 are rich of stoichiometry and a low preselected voltage when such exhaust gases are lean of stoichiometry.

Continuing with FIG. 1, intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Figure 2:
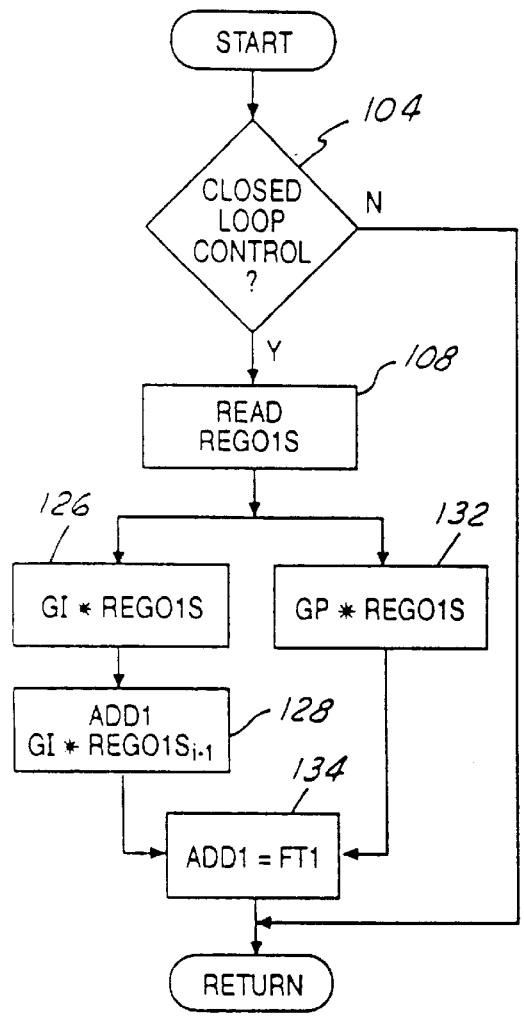
FIGS. 2–8, 10 are high level flow charts of various operations performed by a portion of the embodiment shown in FIG. 1.

Referring now to FIG. 2, a flowchart of a routine performed by controller 10 to generate fuel trim signal FT1 for the first bank of engine 28 is now described. A determination is first made whether closed-loop air/fuel control is to be commenced (step 104) by monitoring engine operation conditions such as temperature. When closed-loop control commences, signal REGO1S is read from comparator 55 (step 108) and subsequently processed in a proportional plus integral controller as described below.

Referring first to step 126, signal REGO1S is multiplied by gain constant GI and the resulting product added to products previously accumulated (GI * REGO1S$_{i-1}$) in step 128. Stated another way, signal REGO1S is integrated each sample period (i) in steps determined by gain constant GI. During step 132, signal REGO1S is also multiplied by proportional gain GP. The integral value from step 128 is added to the proportional value from step 132 during addition step 134 to generate fuel trim signal FT1.

Figure 3:
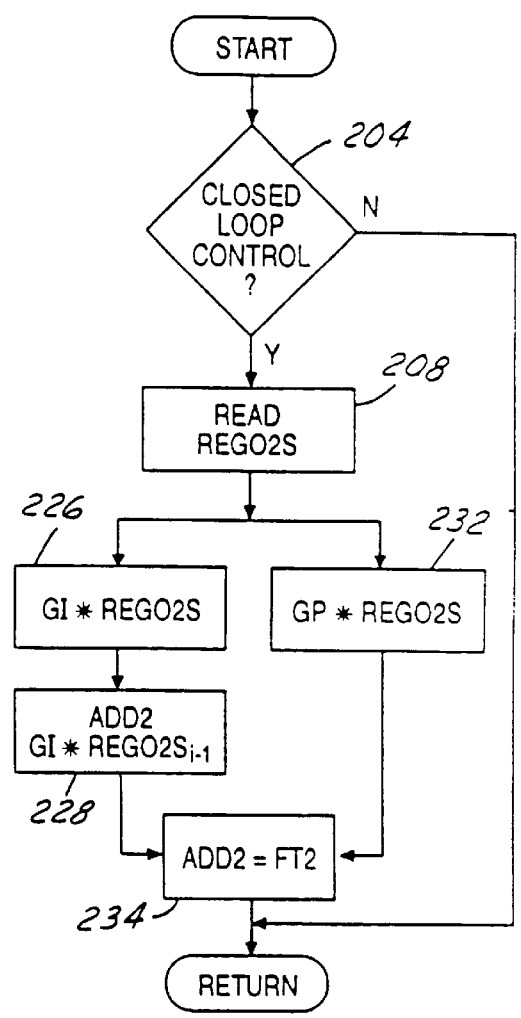

Referring now to FIG. 3, a flowchart of a routine performed by controller 10 to generate fuel trim signal FT2 for the second bank of engine 28 is now described. A determination is first made whether closed-loop air/fuel control is to be commenced (step 204) by monitoring engine operation conditions such as temperature. When closed-loop control commences, signal REGO2S is read from comparator 54 (step 208) and subsequently processed in a proportional plus integral controller as described below.

Referring first to step 226, signal REGO2S is multiplied by gain constant GI and the resulting product added to products previously accumulated (GI * REGO2S$_{i-1}$) in step 228. Stated another way, signal REGO2S is integrated each sample period (i) in steps determined by gain constant GI. During step 232, signal REGO2S is also multiplied by proportional gain GP. The integral value from step 228 is added to the proportional value from step 232 during addition step 234 to generate fuel trim signal FT2.

Figure 4:
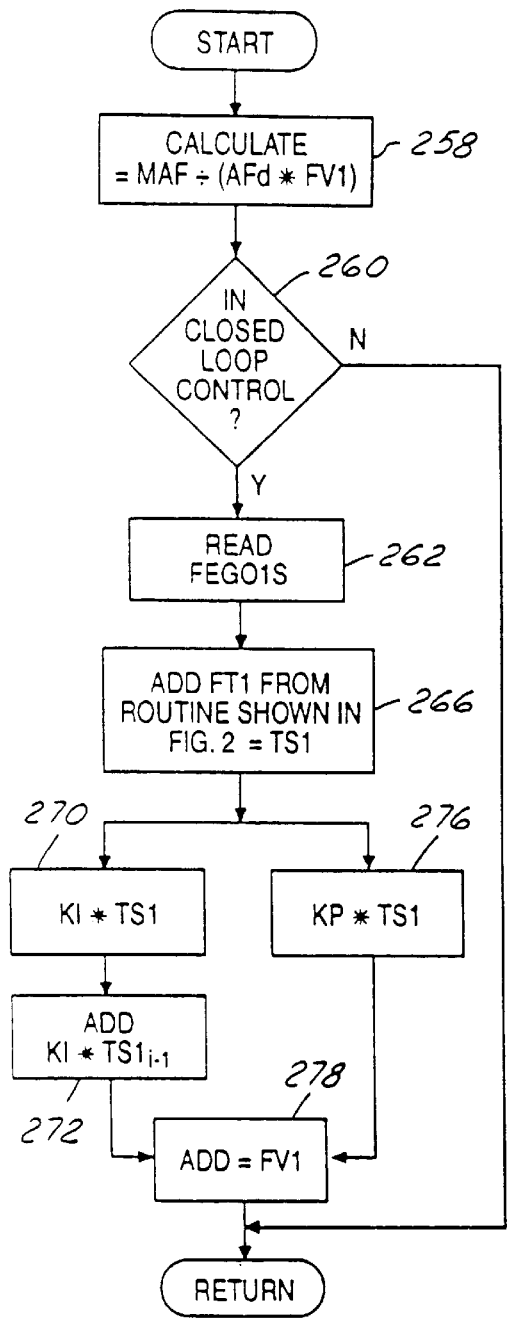

The routine executed by controller 10 to generate the desired quantity of liquid fuel delivered to the first bank of engine 28 and trimming this desired fuel quantity by a feedback variable related both to sensor 45 and fuel trim signal FT1 is now described with reference to FIG. 4. During step 258, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV2.

After determination that closed-loop control is desired (step 260) by monitoring engine operating conditions such as temperature (T), signal FEGO1S is read during step 262. During step 266, fuel trim signal FT1 is transferred from the routine previously described with reference to FIG. 2 and added to signal FEGO1S to generate trim signal TS1.

During steps 270–278, a conventional proportional plus integral feedback routine is executed with trimmed signal TS1 as the input. Trim signal TS1 is first multiplied by integral gain value KI (step 270), and the resulting product added to the previously accumulated products (step 272). That is, trim signal TS1 is integrated in steps determined by gain constant KI each sample period (i) during step 272. A product of proportional gain KP times trimmed signal TS1 (step 276) is then added to the integration of KI * TS1 during step 278 to generate feedback variable FV1.

Figure 5:
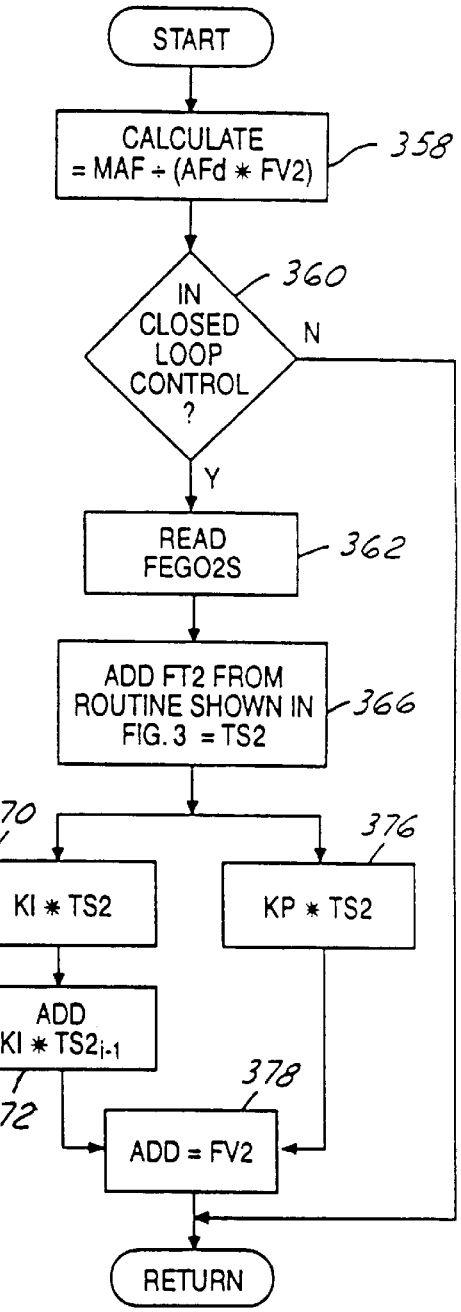

The routine executed by controller 10 to generate the desired quantity of liquid fuel delivered to the second bank of engine 28 and trimming this desired fuel quantity by a feedback variable related both to sensor 44 and fuel trim signal FT2 is now described with reference to FIG. 5. During step 358, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV2.

After determination that closed-loop control is desired (step 360) by monitoring engine operating conditions such as temperature (T), signal FEGO2S is read during step 362. During step 366, fuel trim signal FT2 is transferred from the routine previously described with reference to FIG. 3 and added to signal FEGO2S to generate trim signal TS2.

During steps 370–378, a conventional proportional plus integral feedback routine is executed with trimmed signal TS2 as the input. Trim signal TS2 is first multiplied by integral gain value KI (step 370), and the resulting product added to the previously accumulated products (step 372). That is, trim signal TS2 is integrated in steps determined by gain constant KI each sample period (i) during step 372. A product of proportional gain KP times trimmed signal TS2 (step 376) is then added to the integration of KI * TS2 during step 378 to generate feedback variable FV2.

Figure 6A:
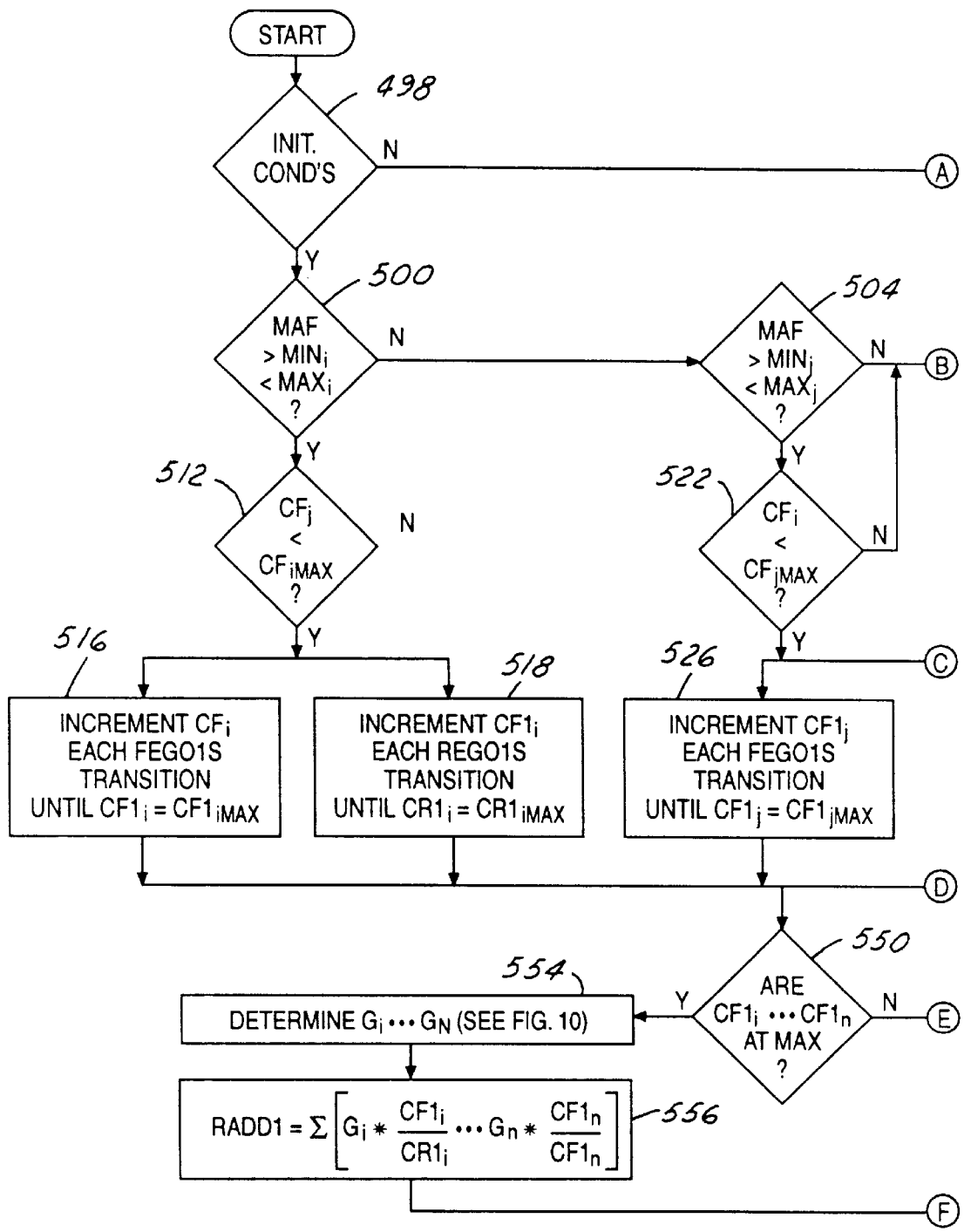
Figure 6B:
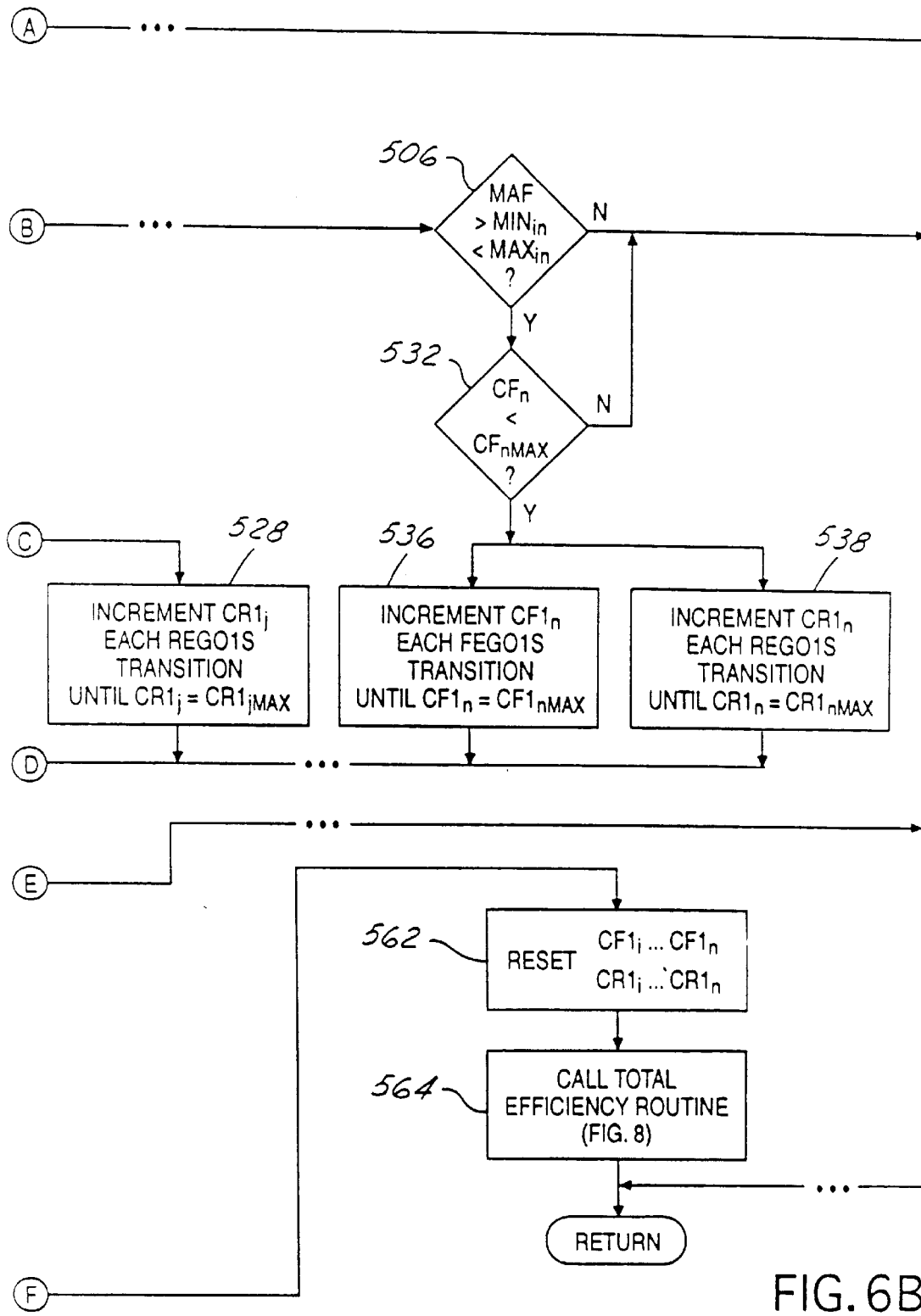

An example of testing converter efficiency of the first engine bank is now described with particular reference to the flowchart shown in FIG. 6. During step 498, initial engine conditions are checked before entering the test cycle described below. More specifically, engine temperature (T) should be within a predetermine range, a predetermined time should have elapsed since the engine was started, and the closed-loop air/fuel control should have been operable for preselected time.

During steps 500, 504, and 506, the inducted airflow range in which engine 28 operating is determined. These ranges are described as range (i), range (j) . . . , range (n) for this example wherein "n" inducted airflow ranges are used to advantage.

Assuming engine operation is within airflow range (i), transitions between states of signal FEGO1S are counted to generate count signal $CF1_i$. This count is compared to maximum count $CF1_{max}$ during step 512. While engine operation remains within airflow range (i), a test period of predetermined duration is generated by incrementing count $CF1_i$ each transition of signal FEGO1S until count $CF1_i$ is equal to maximum count $CF1_{max}$ (step 516). During this test period (i), count $CR1_i$ is incremented each transition of signal REGO1S (step 518). Stated another way, count $CR1_i$ is incremented each transition of signal REGO1S until count $CR1_i = CR1_{max}$.

When engine operation is within airflow range (j) as shown in step 504, predetermined period (j), count $CF1_j$, and count $CR1_j$ are determined in steps 522, 526, and 528 in a manner similar to that described above for airflow range (i) with respect to steps 512, 516, and 518. Each transition in signal FEGO1S, count $CF1_j$ is incremented until it reaches maximum count $CF1_{jmax}$ (step 522). Predetermined test period (j) is thereby defined. During test period (j), count $CR1_j$ is increment each transition of signal REGO1S (step 528).

The above described operation occurs for each airflow range. For example, when engine 28 is operating within airflow range (n) as shown in step 506, test period (n), count $CF1_n$, and count $CR1_n$ are generated as shown in steps 532, 536, and 538.

During step 550, a determination is made as to whether engine 28 has operated in all airflow ranges (i . . . n) for the respective test periods (i . . . n). Stated another way, step 550 determines when each count of transitions in signal FEGO1S ($CF1_i$, $CF1_j$, . . . $CF1_n$) have reached their respective maximum values ($CF1_{imax}$, $CF1_{jmax}$, . . . $CF1_{nmax}$).

During step 554, adjustment gains ($G_i$, $G_j$, . . . $G_n$) are determined as a function of monitored catalytic converter volume of first catalytic converter 51 as later described herein with particular reference to FIG. 10.

In step 556, the ratio of each count ($CF1_i$ . . . $CF1_n$) of transitions in signal FEGO1S for respective test periods (i . . . n) to each count ($CR1_i$ . . . $CR1_n$) of transitions in signal REGO1S for respective test periods (i . . . n) are first multiplied by gains ($G_i$, $G_j$, . . . $G_n$). Then, the resulting values are summed to generate total count RATIO1. For reasons described above each maximum count ($CF1_{imax}$ . . . $CF1_{nmax}$) for respective test periods (i . . . n) can substitute for each count ($CF1_i$ . . . $CF1_n$) for respective test periods (i . . . n). Then, all counts are subsequently reset in step 562. The total efficiency routine is called in step 564.

Figure 7A:
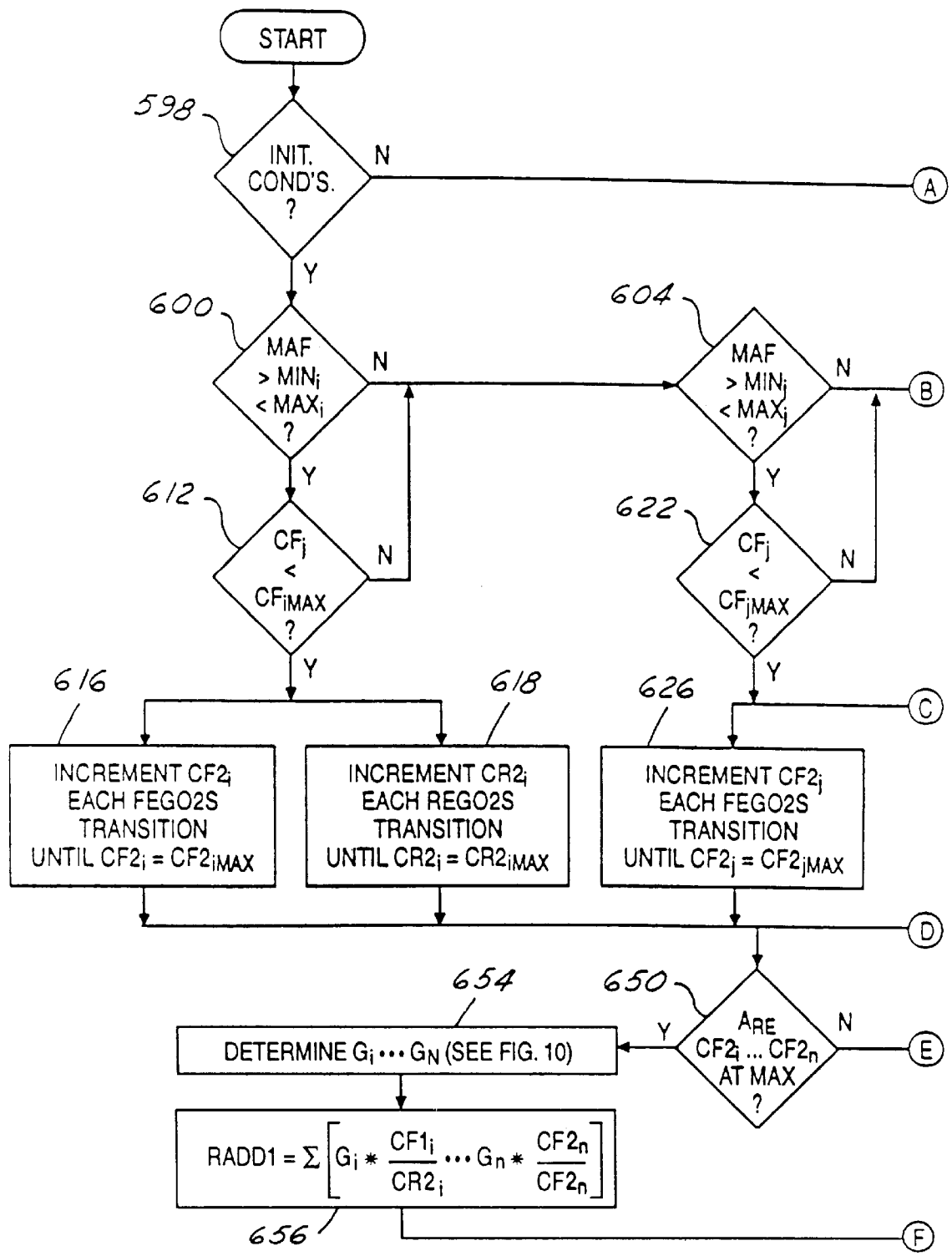
Figure 7B:
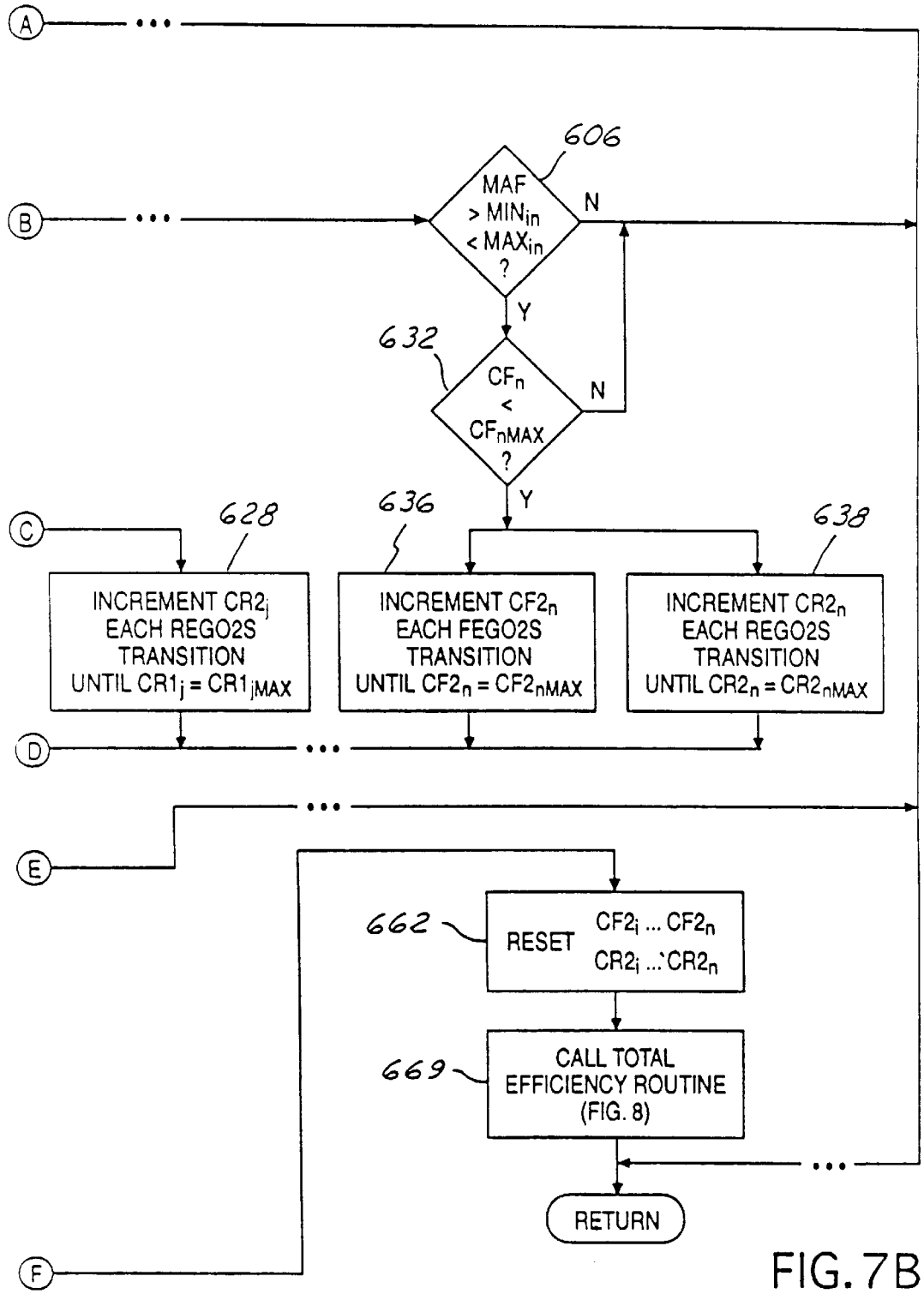

An example of testing converter efficiency of the second engine bank is now described with particular reference to the flowchart shown in FIG. 7. During step 598, initial engine conditions are checked before entering the test cycle described below. More specifically, engine temperature (T) should be within a predetermine range, a predetermined time should have elapsed since the engine was started, and the closed-loop air/fuel control should have been operable for preselected time.

During steps 600, 604, and 606, the inducted airflow range in which engine 28 operating is determined. These ranges are described as range (i), range (j) . . . , range (n) for this example wherein "n" inducted airflow ranges are used to advantage.

Assuming engine operation is within airflow range (i), transitions between states of signal FEGO2S are counted to generate count signal $CF2_i$. This count is compared to maximum count $CF2_{max}$ during step 612. While engine operation remains within airflow range (i), a test period of predetermined duration is generated by incrementing count $CF2_i$ each transition of signal FEGO2S until count $CF2_i$ is equal to maximum count $CF2_{max}$ (step 616). During this test period (i), count $CR2_i$ is incremented each transition of signal REGO2S (step 618). Stated another way, count $CR2_i$ is incremented each transition of signal REGO2S until count $CR2_i = CR2_{max}$.

When engine operation is within airflow range (j) as shown in step 604, predetermined period (j), count $CF2_j$, and count $CR2_j$ are determined in steps 622, 626, and 628 in a manner similar to that described above for airflow range (i) with respect to steps 612, 616, and 618. Each transition in signal FEGO2S, count $CF2_j$ is incremented until it reaches maximum count $CF2_{jmax}$ (step 622). Predetermined test period (j) is thereby defined. During test period (j), count $CR2_j$ is increment each transition of signal REGO2S (step 628).

The above described operation occurs for each airflow range. For example, when engine 28 is operating within airflow range (n) as shown in step 606, test period (n), count $CF2_n$, and count $CR2_n$ are generated as shown in steps 632, 636, and 638.

During step 650, a determination is made as to whether engine 28 has operated in all airflow ranges (i . . . n) for the respective test periods (i . . . n). Stated another way, step 650 determines when each count of transitions in signal FEGO2S ($CF2_i$, $CF2_j$, . . . $CF2_n$) have reached their respective maximum values ($CF2_{imax}$, $CF2_{jmax}$, . . . $CF2_{nmax}$).

During step 654, adjustment gains ($G_i$, $G_j$, . . . $G_n$) are determined as a function of monitored catalytic converter volume of second catalytic converter 50 as later described herein with particular reference to FIG. 10.

In step 656, the ratio of each count ($CF2_i$ . . . $CF2_n$) of transitions in signal FEGO2S for respective test periods (i . . . n) to each count ($CR2_i$ . . . $CR2_n$) of transitions in signal REGO2S for respective test periods (i . . . n) are first multiplied by gains ($G_i$, $G_j$, . . . $G_n$). Then, the resulting values are summed to generate total count RATIO2. For reasons described above each maximum count ($CF2_{imax}$ . . . $CF2_{nmax}$) for respective test periods (i . . . n) can substitute for each count ($CF2_i$ . . . $CF2_n$) for respective test periods (i . . . n). Then, all counts subsequently reset in step 562. The total efficiency routine is called in step 564.

The actual ratios calculated in step 556 and 656 are used to provide a measurement of converter efficiencies. Due to the advantages described previously herein, this indication of converter efficiency is accurate over a wider range of monitored catalytic converter volumes than heretofore possible.

The total efficiency routine for determining when combined catalytic converter efficiency has degraded below a predetermined level is now described with particular reference to FIG. 8. When RATIO1 is greater than a first predetermined threshold (Thresh1) or RATIO2 is greater than the first predetermined threshold (Thresh1) (step 800) then a flag is set indicating that the combined catalytic converter efficiency has degraded below a predetermined level (step 801). If not, when RATIO1 is greater than a second predetermined threshold (Thresh2) and RATIO2 is greater than a third predetermined threshold (Thresh3) (step 802) then a flag is set indicating that the combined catalytic converter efficiency has degraded below a predetermined level (step 801). If not, when RATIO2 is greater than the second predetermined threshold (Thresh2) and RATIO3 is greater than the third predetermined threshold (Thresh3) (step 804) then a flag is set indicating that the combined catalytic converter efficiency has degraded below a predetermined level (step 801).

Figure 8:
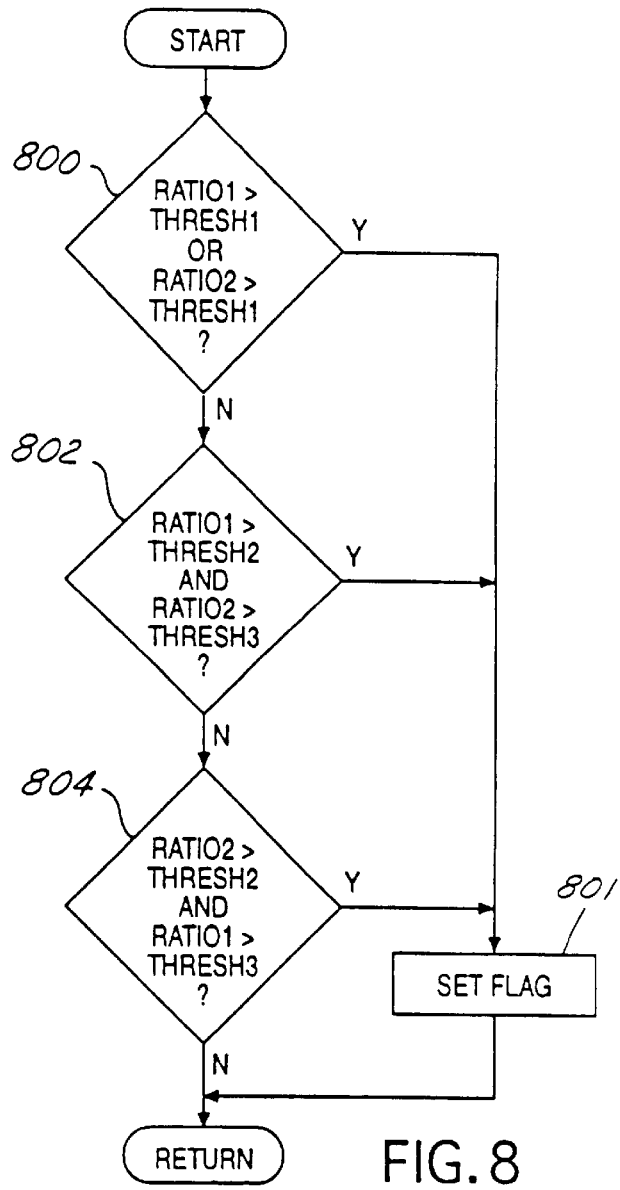
Figure 9:
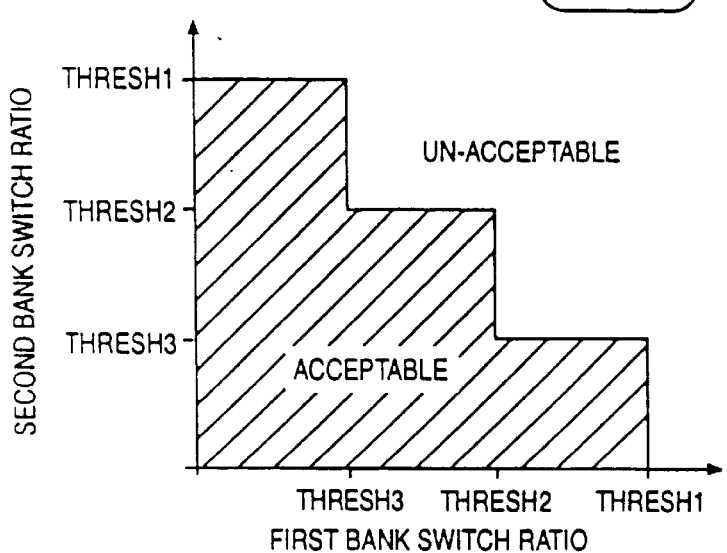
FIGS. 9, 11–12 are figures showing various relationships used in various operations performed by a portion of the embodiment shown in FIG. 1.

FIG. 9 shows an example of a curve described by the routine in FIG. 8. When the combined plot of first and second bank switch ratios (RATIO1 and RATIO2) fall within the cross-hatched region, the combined catalytic converter efficiency is within acceptable limits. When the combined plot of first and second bank switch ratios (RATIO1 and RATIO2) fall outside the cross-hatched region, the flag is set indicating that the combined catalytic converter efficiency has degraded below a predetermined level.

An example of operation has been presented wherein the routine described in FIG. 8 represents a piece-wise linear curve separating acceptable and unacceptable combinations of first and second bank switch ratios. Alternatively, the routine described in FIG. 8 could be reconfigured by one of ordinary skill in the art to represent any possible two-dimensional curve. The curve could be determined by experimental testing, theoretical models, any combination of the two, or any other method known to those skilled in the art and suggested by this disclosure. Also, the method could be reconfigured so that a function of RATIO1 and RATIO2 (for example, an elliptical function described by the function f below) could be compared to a single predetermined number.

$$f = \left(\frac{RATIO1}{A}\right)^2 + \left(\frac{RATIO2}{B}\right)^2$$

Figure 10:
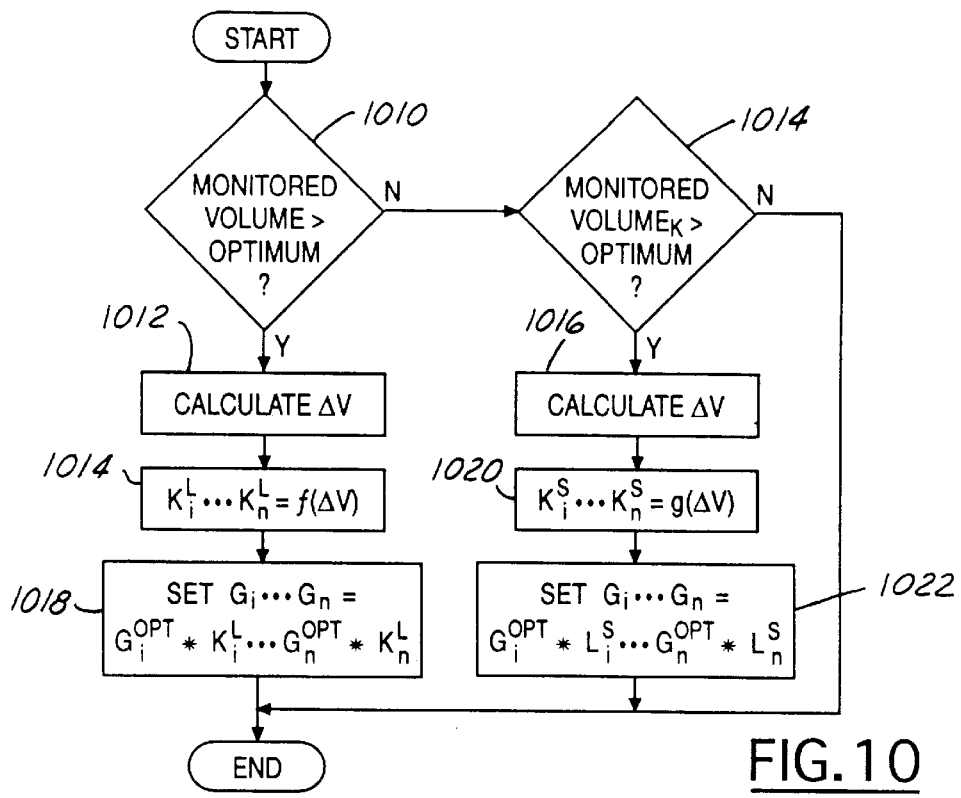

According to the present invention, the adaptive gain selection routine for determining adjustment gains as a function of airflow and catalytic converter characteristics to be used in steps 554 and 654 is now described with particular reference to FIG. 10. In step 1010 a determination is made as to whether the current catalytic converter for which adjustment gains are to be calculated has initial characteristics. In this particular example, a determination is made as to whether the current catalytic converter for which adjustment gains are to be calculated has an initial volume being monitored. Typically, determination of the initial volume to monitor is based on experimental testing of purposely degraded catalysts of various sizes.

When the monitored volume of the current catalytic converter for which adjustment gains are to be calculated is greater than the initial volume, the volume deviation ($\Delta V$) is calculated from the volume difference in step 1012. In step 1014 a determination is made as to whether the current catalytic converter for which adjustment gains are to be calculated has an initial volume being monitored. When the monitored volume of the current catalytic converter for which adjustment gains are to be calculated is less than the initial volume, the volume deviation ($\Delta V$) is calculated from the volume difference in step 1016.

Continuing with step 1014, which follows from step 1012, first adjustment factors ($K^L_i$, $K^L_j$, ... $K^L_n$) are calculated based on a function (f) of the volume deviation ($\Delta V$). Typically, this function is determined empirically from testing various sized monitored volumes. An example of first adjustment factors ($K^L_i$, $K^L_j$, ... $K^L_n$) are described later herein with particular reference to FIG. 11.

In step 1018, adjustment gains ($G_i$, $G_j$, ... $G_n$) are calculated by multiplying first adjustment factors ($K^L_i$, $K^L_j$, ... $K^L_n$) by optimal gains ($G_i^{OPT}$, $G_j^{OPT}$, ... $G_n^{OPT}$). Optimal gains ($G_i^{OPT}$, $G_j^{OPT}$, ... $G_n^{OPT}$) are the gains that would be used with an initially sized catalytic converter for monitoring.

Continuing with step 1020, which follows from step 1016, second adjustment factors ($K^S_i$, $K^S_j$, ... $K^S_n$) are calculated based on a function (g) of the volume deviation ($\Delta V$). Typically, this function is determined empirically from testing various sized monitored volumes. An example of second adjustment factors ($K^S_i$, $K^S_j$, ... $K^S_n$) are described later herein with particular reference to FIG. 12. In step 1022, adjustment gains ($G_i$, $G_j$, ... $G_n$) are calculated by multiplying second adjustment factors ($K^S_i$, $K^S_j$, ... $K^S_n$) by optimal gains ($G_i^{OPT}$, $G_j^{OPT}$, ... $G_n^{OPT}$).

In this way, variations in catalytic converter characteristics can be accounted for thereby optimizing catalytic converter monitoring. For example, if a larger catalytic converter is required to meet emission regulations, then the volume increase can be directly used to adapt adjustment gains accordingly. The entire testing procedure for recalibrating is not required and significant time savings are realized.

Figure 11:
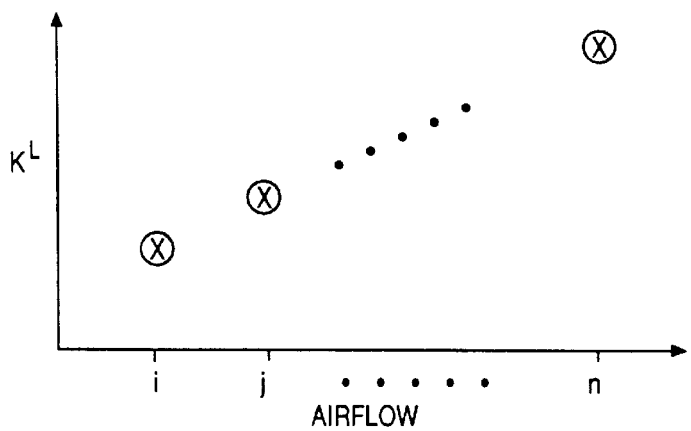

Referring now to FIG. 11, a typical plot of first adjustment factors ($K^L_i$, $K^L_j$, ... $K^L_n$) is shown where airflow is on the horizontal axis. Thus, when a monitored volume is larger than an initial volume, greater weight is given to switch ratios at high airflow as and lower weight is given to switch ratios at low airflow. The graph of FIG. 11 has a proportional relationship between airflow and adjustment factors ($K^L_i$, $K^L_j$, ... $K^L_n$). Because catalytic converter efficiency degradation of larger than initially sized catalytic converters is better characterized at large airflows, a more accurate determination is made regarding the actual catalytic converter efficiency.

Figure 12:
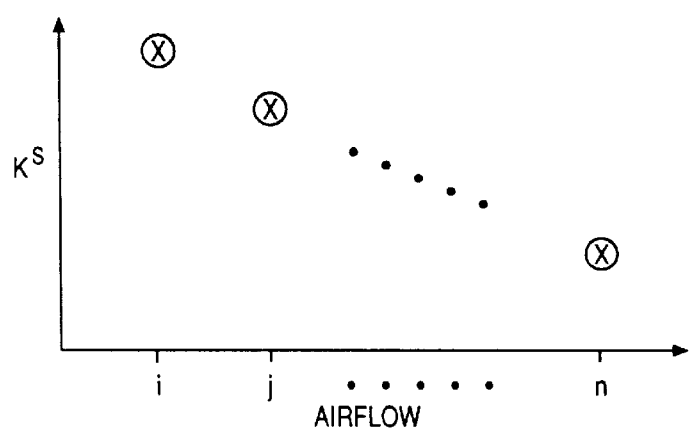

Referring now to FIG. 12, a typical plot of first adjustment factors ($K^S_i$, $K^S_j$, ... $K^S_n$) is shown where airflow is on the horizontal axis. Thus, when a monitored volume is smaller than an initial volume, greater weight is given to switch ratios at low airflow and lower weight is given to switch ratios at high airflow. The graph of FIG. 12 has an inversely proportional relationship between airflow and adjustment factors ($K^S_i$, $K^S_j$, ... $K^S_n$). Because catalytic converter efficiency degradation of smaller than an initially sized catalysts is better characterized at low airflows, a more accurate determination is made regarding the actual catalytic converter efficiency.

The gain selection routine of the present invention allows more accurate diagnosis of catalytic converter degradation when the monitored catalytic converter volume deviates from an initial volume by using adjustment gains ($G_i$, $G_j$, ... $G_n$) to obtain a more representative ratio.

Although one example of an embodiment which practices the invention has been described herein, there are numerous other examples which could also be described. For example, the invention may be used to advantage with carbureted engines, proportional exhaust gas oxygen sensors, and engines having an in-line configuration rather than a V-configuration. The invention is therefore to be defined only in accordance with the following claims.

We claim:

1. A monitoring method for an internal combustion engine with an emission control device, the method comprising the steps of:
    determining an airflow range in which the engine is currently operating;
    calculating an emission control device performance index from exhaust gas sensors positioned upstream and downstream of the emission control device;
    determining a gain based on said airflow range;
    adjusting said gain based on an emission control device characteristic relative to an initial emission control device characteristic and based on said airflow range;
    modifying said emission control device performance index based on said adjusted gain; and
    indicating degradation based on said modified emission control device performance index.

2. The method recited in claim 1 wherein said emission control device characteristic is an emission control device size.

3. The method recited in claim 2 wherein said adjusting step comprises the steps of:
    adjusting said gain proportionally to said airflow range when the emission control device is larger than said initial emission control device; and
    adjusting said gain inversely proportional to said airflow range when the emission control device is smaller than said initial emission control device.

4. The method recited in claim 2 wherein said adjusting step comprises the step of increasing said gain when the emission control device is smaller than said initial emission control device and said air flow range is relatively low.

5. The method recited in claim 2 wherein said adjusting step comprises the step of increasing said gain when the emission control device is larger than said initial emission control device and said air flow range is relatively high.

6. The method recited in claim 2 wherein said adjusting step comprises the step of decreasing said gain when the emission control device is smaller than said initial emission control device and said air flow range is relatively high.

7. The method recited in claim 2 wherein said adjusting step comprises the step of decreasing said gain when the emission control device is larger than said initial emission control device and said air flow range is relatively low.

8. The method recited in claim 2 wherein said emission control device is a catalytic converter.

9. A monitoring method for an internal combustion engine with an emission control device, the method comprising the steps of:
    determining an airflow range in which the engine is currently operating;
    calculating an emission control device performance index from exhaust gas sensors positioned upstream and downstream of the emission control device;
    determining a gain based on said airflow range;
    adjusting said gain proportionally to said airflow range when the emission control device is larger than an initially sized emission control device;
    adjusting said gain inversely proportional to said airflow range when the emission control device is smaller than said initial emission control device;
    modifying said emission control device performance index based on said adjusted gain; and
    indicating degradation based on said modified emission control device performance index.

10. The method recited in claim 9 further comprising the step of increasing said gain when the emission control device is smaller than said initial emission control device and said air flow range is relatively low.

11. The method recited in claim 10 further comprising the step of increasing said gain when the emission control device is larger than said initial emission control device and said air flow range is relatively high.

12. The method recited in claim 11 further comprising the step of decreasing said gain when the emission control device is smaller than said initial emission control device and said air flow range is relatively high.

13. The method recited in claim 12 further comprising the step of decreasing said gain when the emission control device is larger than said initial emission control device and said air flow range is relatively low.

14. The method recited in claim 13 wherein said emission control device is a catalytic converter.

15. A monitoring system for an internal combustion engine, the system comprising:
    an emission control device;
    a first exhaust gas sensor positioned upstream of said emission control device;
    a second exhaust gas sensor positioned downstream of said emission control device; and
    a computer for determining an airflow range in which the engine is currently operating, calculating an emission control device performance index from a first number of transitions from a first state to a second state of said first exhaust gas oxygen sensor and a second number of transitions from said first state to said second state of said second exhaust gas oxygen sensor, determining a gain based on said airflow range, adjusting said gain based on an emission control device characteristic relative to an initial emission control device characteristic and based on said airflow range, modifying said emission control device performance index based on said adjusted gain, and indicating degradation based on said modified emission control device performance index.

16. The system recited in claim 15 wherein said emission control device characteristic is an emission control device size.

17. The system recited in claim 15 wherein said computer further adjusts said gain proportionally to said airflow range when said emission control device is larger than said initial emission control device, and adjusts said gain inversely proportional to said airflow range when the emission control device is smaller than said initial emission control device.

18. The system recited in claim 15 wherein said computer further increases said gain when said emission control device is smaller than said initial emission control device and said air flow range is relatively low.

19. The method recited in claim 15 wherein said computer further increases said gain when said emission control device is larger than said initial emission control device and said air flow range is relatively high.

20. The method recited in claim 15 wherein said computer further decreases said gain when said emission control device is smaller than said initial emission control device and said air flow range is relatively high.

21. The method recited in claim 15 wherein said computer further decreases said gain when said emission control device is larger than said initial emission control device and said air flow range is relatively low.

* * * * *